United States Patent
Kane

(10) Patent No.: US 10,655,744 B2
(45) Date of Patent: May 19, 2020

(54) REAL-TIME EROSION CONTROL IN FLOW CONDUITS

(71) Applicant: WorleyParsons Europe Ltd., Brentford (GB)

(72) Inventor: Prasad Laxman Kane, Woking (GB)

(73) Assignee: WorleyParsons Europe Ltd., Brentford (GB)

( * ) Notice: Subject to any disclaimer, the term of this patent is extended or adjusted under 35 U.S.C. 154(b) by 0 days.

(21) Appl. No.: 15/742,131

(22) PCT Filed: Jul. 7, 2016

(86) PCT No.: PCT/EP2016/066158
§ 371 (c)(1),
(2) Date: Jan. 5, 2018

(87) PCT Pub. No.: WO2017/005862
PCT Pub. Date: Jan. 12, 2017

(65) Prior Publication Data
US 2018/0195631 A1    Jul. 12, 2018

Related U.S. Application Data

(60) Provisional application No. 62/189,415, filed on Jul. 7, 2015.

(51) Int. Cl.
*F16K 25/04* (2006.01)
*F16K 3/08* (2006.01)
(Continued)

(52) U.S. Cl.
CPC ............ *F16K 25/04* (2013.01); *F16K 3/0254* (2013.01); *F16K 3/085* (2013.01); *F16L 55/02718* (2013.01)

(58) Field of Classification Search
CPC ........ F16K 25/04; F16K 3/0254; F16K 3/085; F16L 55/02718
(Continued)

(56) References Cited

U.S. PATENT DOCUMENTS 721,821 A * 5/1903 Myers ................. F16K 37/0008
137/556
3,334,861 A * 8/1967 Westbrook .............. F16K 3/085
251/208
(Continued)

FOREIGN PATENT DOCUMENTS

EP    1 351 008 A1    10/2003
FR    2 452 040 A1    10/1980

OTHER PUBLICATIONS

International Search Report issued in PCT/EP2016/066158 dated Dec. 6, 2016 (4pages).
(Continued)

*Primary Examiner* — Kevin L Lee
(74) *Attorney, Agent, or Firm* — Osha Liang LLP

(57) ABSTRACT

Apparatus and systems for mitigating erosion in flow conduits, and may include a housing including a fluid inlet and a fluid outlet and a flow path there between. A movable or static (passive) insert is disposed within the housing and may be configured to alter a flow of a fluid passing from the fluid inlet to the fluid outlet. The apparatus may also include a mechanism to adjust a position of the movable insert.

36 Claims, 11 Drawing Sheets

(51) Int. Cl.
*F16L 55/027* (2006.01)
*F16K 3/02* (2006.01)

(58) Field of Classification Search
USPC .................................................. 251/205, 206
See application file for complete search history.

(56) References Cited

U.S. PATENT DOCUMENTS 6,053,056 A * 4/2000 Zaiser ..................... F16K 3/34
251/205
8,613,607 B2 * 12/2013 Darsey ................ F04B 39/0055
251/205

OTHER PUBLICATIONS

Written Opinion of the International Searching Authority issued in PCT/EP2016/066158 dated Dec. 6, 2016 (11 pages).
Office Action issued in corresponding Canadian Application No. 2,991,568, dated Aug. 30, 2019 (3 pages).

* cited by examiner

REAL-TIME EROSION CONTROL IN FLOW CONDUITS

FIELD OF THE DISCLOSURE

Embodiments disclosed herein relate generally to processes and systems for mitigating erosion in pipes and other flow conduits.

BACKGROUND

Numerous types of processes involve the transport of liquids and gases between two locations. These fluids may contain, purposefully or otherwise, solids. For example, oil and gas assets may have sand in the produced hydrocarbons and/or sometimes there are solid contaminants called black powder produced as a byproduct of corrosion. The sand, solid contaminants, or other entrained solids, may cause an irreversible loss of material, due to abrasive effects, on an internal surface of a flow path. Damage caused by erosion may affect production, such as by causing a stoppage, may increase risk of catastrophic failures, and costs operators billions of dollars annually.

Various means for mitigating erosion have been proposed. For example, adding additional thickness to bends, or providing an erosion resistant coating to an internal surface of a flowline may provide additional on-stream time before measures must be taken to account for the accumulated erosion. Others have proposed adding flow directing elements to a flowline to alter a flow pattern of a fluid. However, these flow directing elements often fail themselves due to erosion.

SUMMARY OF THE DISCLOSURE

Embodiments disclosed herein relate generally to processes and systems for mitigating erosion in pipes and other flow conduits. Flow conduits that may benefit from embodiments herein may include any type of passageway used for transporting liquids, gases, solids, and slurries. Such flow conduits may be any shape, such as cylindrical pipes or square ducts, among others, and may be referred to herein as flowlines and pipes, among other synonymous terms and variants. More specifically, processes and systems disclosed herein provide for mechanisms to mitigate erosion, adjust wear patterns, and reduce wear rates.

In one aspect, embodiments disclosed herein relate to an apparatus for mitigating erosion in flow conduits. The apparatus may include: a housing including a fluid inlet and a fluid outlet and a flow path there between. A movable insert is disposed within the housing and may be configured to alter a flow of a fluid passing from the fluid inlet to the fluid outlet. The apparatus may also include a mechanism to adjust a position of the movable insert.

In another aspect, embodiments disclosed herein relate to a system for mitigating erosion in a flow conduit. The system may include the above-described apparatus for mitigating erosion in flow conduit and a control system configured to adjust a position of the movable insert.

In another aspect, embodiments disclosed herein relate to a method for mitigating erosion in a flow conduit. The method may include disposing the above-described apparatus for mitigating erosion in a flow conduit, passing a fluid through the apparatus, and adjusting a position of the movable insert.

Other aspects and advantages will be apparent from the following description and the appended claims.

DETAILED DESCRIPTION

Figure 1:
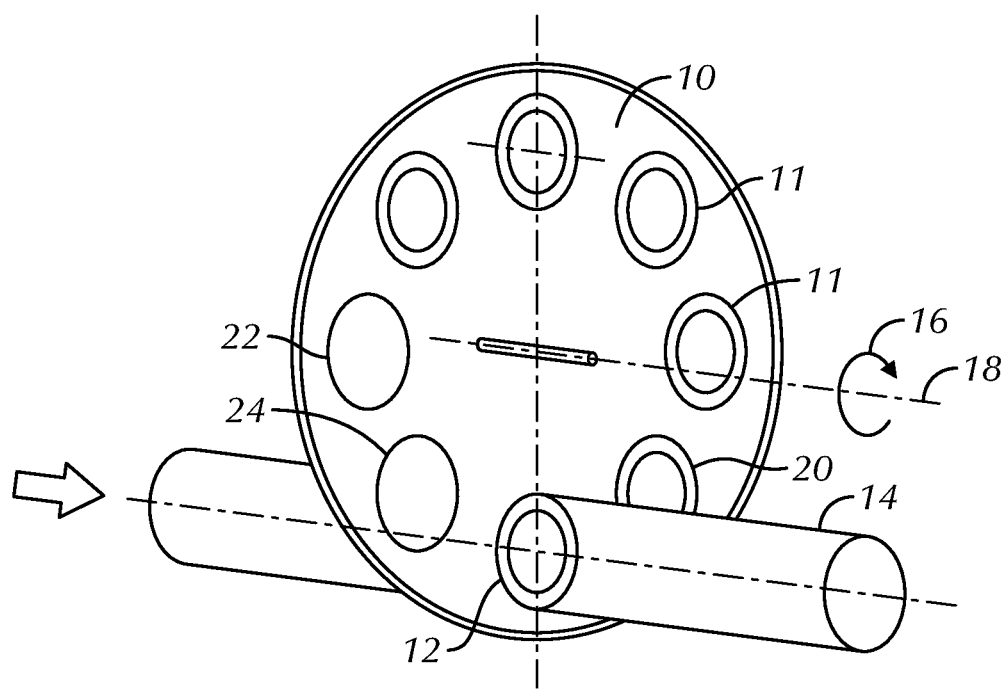
FIG. 1 is an isometric view of an apparatus for mitigating erosion according to embodiments herein.

Erosion in flowlines may occur in numerous places. For example, entrained solids may impact internal surfaces of the flowline along bends, the momentum of the entrained solids carrying the particles at a different path than the bulk fluid flow. As another example, erosion may occur at an expansion, which may induce eddying, recirculation patterns, or other turbulence in the flow, as well as at contractions. Erosion may also occur along straight sections of pipe. Further, compact designs of flowlines may often lead to strongly swirling flow, which is detrimental as it may lead to very localized and concentrated impacts of solids on the internal surfaces of the flowline.

Apparatus disclosed herein may be used to mitigate erosive effects of solids. More specifically, processes and systems disclosed herein provide for mechanisms to mitigate erosion, improve on-stream time, adjust wear patterns, and/ or reduce wear rates. These mechanisms, as will be described below, may include passive or active measures.

Apparatus for mitigating erosion in flowlines according to embodiments herein may include a housing including a fluid inlet and a fluid outlet and a flow path there between. A movable insert or inserts, examples of which are described in greater detail below, may be disposed within the housing along the flow path. The movable insert is configured to alter a flow of a fluid, such as a liquid or a gas, passing from the fluid inlet to the fluid outlet. For example, the movable insert may include surfaces that disrupt flow, create an area of turbulence, direct flow, induce a swirl, or otherwise interfere in some manner with the flow pattern of the fluid that would result in the absence of the movable insert. For example, where a flowline includes a tight bend that results in a swirling flow pattern, the swirl may result in an area of high erosion, concentrating particle impacts along the swirl. A movable insert may be configured and placed to reduce or eliminate the swirl, such as by introducing a counter-swirl or an area of turbulence to break up the formation of the swirl, where placement of the insert may be upstream or midstream relative to the area of swirl the insert is intended to impact.

The apparatus may also include a mechanism, such as one or more of a gear, a slide, a sleeve, a spring, a magnet or linear motor, and an actuator, to adjust a position of the movable insert. Adjustment of the position of the movable insert may be performed, in various embodiments, manually, remotely via a control system, or via a remotely operated vehicle, such as a subsea ROV. Further, the adjustment may be made in a continuous manner, moved to a new position as required, or may be pseudo-continuous, such as where the movable insert may only take discrete positions using an indexing mechanism.

Because the inserts are placed into the flowline, they are also subject to wear. Additionally, changing flow conditions, such as increases or decreases in flow rate, solids content, or the size of entrained particles, may result in a change in the flow pattern that may be impacted by a particular insert. Due to erosion of the insert or varying flow patterns, the ability to adjust a position of the movable insert provides advantages in that the surface of the insert may be renewed, restoring or continuing the effectiveness of the insert, or the insert may be adjusted to more favorably reduce erosive effects at different operating conditions.

Movable inserts may be formed in one or more manners according to embodiments herein. As a first example, a movable insert may be formed as an index plate having two or more holes positionable within the flow path. The portion of the index plate around the holes through the index plate may restrict flow within the flow path, and may include a restriction to flow across the entire circumference or perimeter of the inner surface of the flow path, or may include a restriction to flow across one or more portions of the circumference or perimeter of the inner surface of the flow path, such as a restriction over a quarter- or half-circle.

An index plate may include, for example, two or more holes spaced apart angularly on the index plate. In this embodiment, the mechanism may be configured to rotate the index plate. Although spaced angularly and rotated, the index plate may be circular or non-circular. In some embodiments, the holes may be spaced apart equally on the index plate. In other embodiments, the holes may be spaced apart selected, non-equal distances on the linear index plate.

As an example, an index plate may include two holes spaced apart by 90 degrees or 180 degrees. The surface of the index plate exposed to flow within the flow path, which may be referred to herein as a wear surface or a flow disrupting surface, may become worn or eroded over time. After the wear surface of the first hole is worn to the point of being ineffective at altering the flow or wear pattern in a desired manner, the index plate may be rotated such that the second of the two holes is disposed within the flow path.

Another example of an angular index plate is illustrated in FIG. 1, an isometric view of the index plate disposed in relation to a flow path. As illustrated, index plate 10 may include eight holes 11 spaced apart angularly on the plate. The holes 11 are spaced equally, the center of each being 45 degrees apart from an adjacent hole. The holes may be surrounded by a wear surface 12 disposed along a flow path 14. After the wear surface 12 is worn, index plate 10 may be rotated 16 along axis 18 by 45 degrees to dispose a fresh wear surface 20 within the flow path 14. Continued wear and rotation may thus prolong the effectiveness at flow disruption and erosion mitigation. As illustrated in FIG. 1, the index plate includes two worn wear surfaces in holes 22, 24, and six "fresh" wear surfaces, including 12 and 20.

Figure 2:
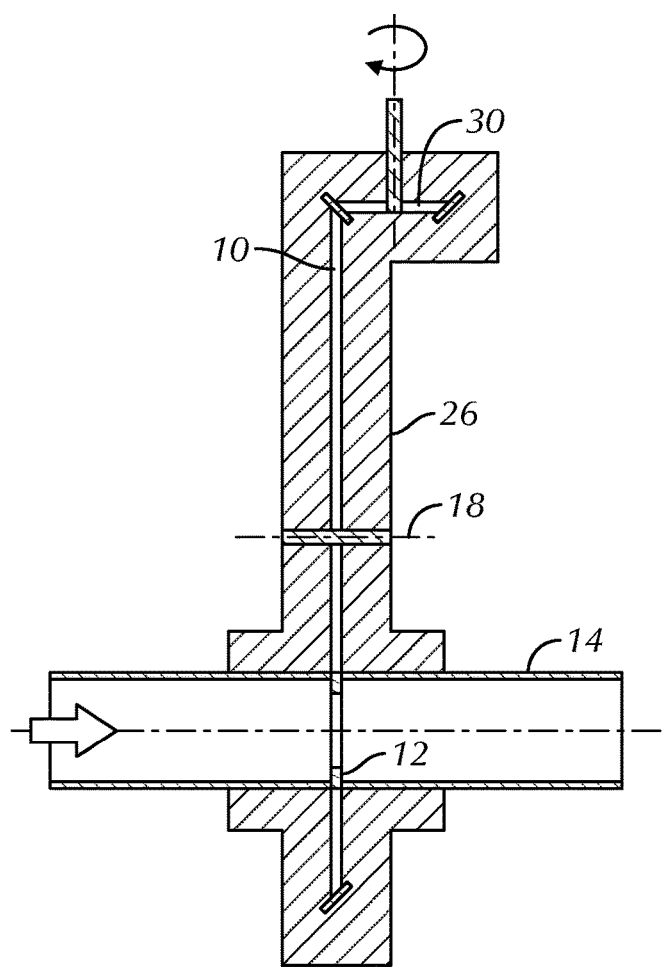
FIG. 2 is a sectional view of an apparatus for mitigating erosion according to embodiments herein.

A sectional view of an apparatus for mitigating erosion in flowlines incorporating an angular index plate is illustrated in FIG. 2, where like numerals represent like parts. The apparatus may include a housing 26, within which is disposed an angular index plate 10. To rotate the index plate, a bevel gear 30 may be operatively connected to the index plate 10, which in turn may be operatively connected to an actuator (not shown) or another mechanism to actuate bevel gear 30 and rotate index plate 10 a desired amount.

Figure 3:
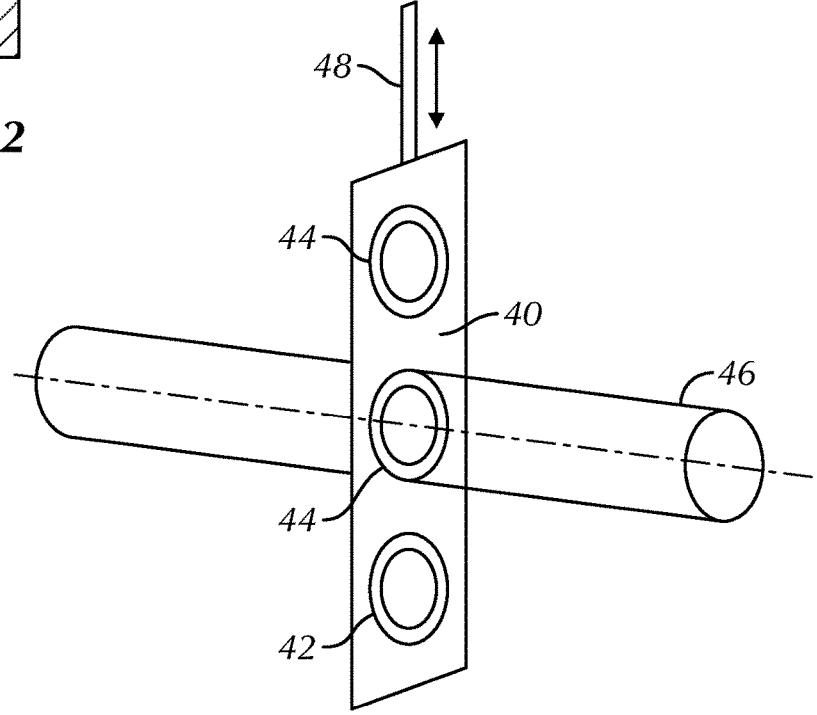
FIG. 3 is an isometric view of an apparatus for mitigating erosion according to embodiments herein.

Another example of an index plate is illustrated in FIG. 3, an isometric view of a linear index plate disposed in a flow path. Linear index plate 40 may include two or more holes 42 spaced apart linearly along the index plate. The holes may be surrounded by a wear surface 44 disposed along a flow path 46. After a wear surface 44 is worn, index plate 40 may be moved linearly to dispose a fresh wear surface 44 within the flow path 46. As illustrated in FIG. 3, the index plate includes one worn wear surface and two "fresh" wear surfaces. In some embodiments, the holes may be spaced apart equally on the linear index plate. In other embodiments, the holes may be spaced apart selected, non-equal distances on the linear index plate. Additionally, although illustrated as moving up and down, a linear index plate may be positioned at any angle (up and down, side to side, at a 45 degree angle to horizontal, flat (i.e., along a vertical pipe section), etc.). To move the index plate, a rod 48 may be connected to the index plate 40, which in turn may be operatively connected to an actuator (not shown) or another mechanism to move the rod, and thus the index plate, a desired distance.

In some embodiments, after the wear surfaces of an index plate are consumed, the index plate may be replaced. In other embodiments, the index plate may be configured to receive removable/replaceable wear inserts. The replaceable wear inserts may be disposed in the holes of an index plate, providing a sacrificial surface that is disposed within the flow path in operation.

After one or more of the wear inserts are worn, they may be replaced. Replacement of a wear insert may be effected, for example, by dismantling the housing, which may be formed from two or more component parts, to access the index plate and remove worn inserts and place new wear inserts within the holes.

In other embodiments, the housing may include one or more access ports. An operating wear insert, disposed in the flow path, may be fluidly isolated from one or more of the remaining holes, such as by one or more seals disposed about the flow path. The access port may provide access to the fluidly isolated portion of the index plate, such that a worn wear surface may be replaced while fluid is passing through or pressurized within the flow path.

For example, referring to the isometric view of FIG. 1, seals may be provided to fluidly isolate the operative wear surface 12 from the remaining portions of the index plate 10. An access port (not shown) in the housing may be used to remove and replace worn wear inserts while the apparatus is in use. Access may provide for one, two, three, four, or up to all seven of the inactive inserts to be replaced while the unit is on-line. A counter may be used to determine when the index plate has rotated the proper number of times and to indicate when the inserts should again be replaced (4, then 4, or after the seventh rotation, for example).

Similarly, for the index plate of FIG. 3, upon extension of the plate downward such that there are two inserts/holes below the flow path and one active in the flow path, the two worn inserts may be removed and replaced by accessing the fluidly sealed portion of the index plate through a first access port. Then, after wear of the uppermost and middle insert, and movement of the plate upward such that there are two inserts/holes above the flow path and the lowermost active in the flow path, the two worn inserts may be removed and replaced by accessing the fluidly sealed portion of the index plate through a second access port. A linear index plate may include more than three holes, but this example illustrates how the continued renewal of wear surfaces may be provided for by replacement of inserts when the operative insert is the uppermost or lowermost position.

As noted above, the wear surfaces may encompass the entirety of a hole or may be disposed over only a portion of the hole. Where the insert is disposed to only impact a selected portion of the flow path, the inserts disposed in the multiple holes of the index plate may be positioned such that, when rotated, the insert impacts the same or different portions of the flow path. The wear inserts disposed within the holes of the index plate may also be the same size or of different sizes, such as extending further into the flow path radially, or extending a greater distance around the flow path circumferentially.

Consistent "fresh" insert size and position may be beneficial where a flow rate and other properties of the fluid flowing within the flow path are bounded within a particular range, and it is not desired to significantly alter the impact the insert has on the flow or wear pattern. The movable inserts in this embodiment may be considered as passive. In contrast, where particle sizes, fluid flow rates, compositions, states, or other variables may vary significantly over relatively short time periods, it may be desirable to have inserts that are of different configurations. In such embodiments, for example, as the properties of the fluid change, the position of the index plate may be varied to selectively use a wear insert configured for the flow conditions. A first insert disposed in a first hole may be suited best for condition A, while a second insert disposed in a second hole, which may be the same or a different shape than the first hole, may be suited best for condition B, each impacting the flow profile or wear pattern as desired relative to the conditions presented. For example, a circular hole/insert may be used under condition A, and a square or triangular hole/insert may be used under condition B. The movable inserts in this latter embodiment may be considered as active, providing real-time active erosion control based on the flow and fluid properties.

Determination of when a wear surface is worn may be effected in any number of ways, including visual inspection, as well as the use of sensors to measure wear. For example, the flow disrupting surfaces on index plates 10, 40, as shown in FIGS. 1 and 3, respectively, have a reduced flow diameter at the wear surface, akin to an orifice plate. A measured pressure differential across the wear surface may be used to provide an indication of the amount of wear and when the index plate should be rotated. The pressure differential may be measured via pressure sensors upstream and downstream of the movable insert. In some embodiments, the housing may include a first pressure port or tap upstream of the movable insert and a second pressure port or tap downstream of the movable insert. Alternatively, wear may be estimated based on flow properties and on-stream service time. In other embodiments, movable inserts may include sensors to measure changes in electrical resistance to provide an indication of wear.

As noted above, properties of a fluid flowing through a flowline may vary. For example, variables associated with flow may include one or more of a bulk flow rate, a local flow velocity, a density, a solids content, a particle size of solids contained in the fluid, a composition of solids contained in the fluid, a momentum of particles contained in the fluid, a change in pressure across the apparatus. As one example, consider a produced fluid from an oil or natural gas well. The fluid may include a small amount of sand along with the produced fluids, but on occasion may encounter a slug of sand, or a brief or extended period of higher sand content. As another example, a produced fluid from a well may include varying amounts of liquids, gases, and entrained sand. As yet another example, production from a well may experience periods of higher and lower flow rates. In such instances, it would be advantageous to have movable inserts that may provide active, real-time control of the flow profile within a flowline. While index plates with varied inserts may be used, as described above, movable inserts according to other embodiments herein may also be used to effectively tune and smooth out the flow, deflecting sand away from walls, and avoiding or stretching swirling flow patterns over a variety of flow conditions.

Movable inserts according to embodiments herein may include one or more flow disrupting or flow directing surfaces disposed along the flow path and configured to move radially inwards and outwards. For example, a movable insert may include a structure, such as a rod or a rectangular prism, which may be moved inward and outward to disrupt a greater or lesser portion of the fluid flow path. As another example, a movable insert may be crescent-shaped, where the crescent may be moved inward and outward to increase or decrease a size of the crescent and to affect a greater or lesser portion of the fluid flow path. As yet another example, a movable insert may be a fin, which may extend axially and/or circumferentially within the flow path, where the fin may be moved inward and outward to disturb a greater or lesser portion of the fluid flow path.

Radially movable inserts may be used in some embodiments to actively impact the pattern of flow. For example, as flow conditions vary, a rod may be extended further into the flow line so as to increase a turbulent zone, or may be withdrawn so as to decrease a turbulent zone. Measured properties of the fluid passing through the flowline may be used to adjust a radial position of the movable insert so as to modify the flow pattern within the flowline in a desired manner. In some embodiments, the inserts may be fluttered inward and outward so as to provide a continuous disruption and changing flow pattern, not allowing the fluid in the proximate downstream region to develop into a patterned flow.

Radially movable inserts may also be used in other embodiments to passively impact the pattern of flow. For example, as an exposed portion of a crescent or rod may wear, the position of the rod may be adjusted to maintain the crescent or rod at a particular height, effectively renewing the wear surface as it is worn.

Movable inserts according to embodiments herein may also include one or more flow disrupting or flow directing surfaces disposed along the flow path and configured to move circumferentially about the flow path. As discussed above, various flowline configurations may result in a swirling flow pattern. Where the presence of a swirling flow pattern is difficult to mitigate, it may be desirable to effectively move the location of the swirl over time, spreading the resulting wear across multiple portions of the internal surface of the flowline. Alternatively, as flow conditions change, the effectiveness of a particularly located insert may become less effective. In such instances, adjustment of a position of a wear surface circumferentially within a flow path may provide the desired effect.

Movable inserts according to embodiments herein may also include one or more flow disrupting or flow directing surfaces disposed along the flow path and configured to move axially along the flow path. As discussed above, higher and lower flow velocities or changes in particle size, among other variables, may result in a change in where the erosive impact of the flow is greatest. The ability to move a wear surface axially within a flow path may advantageously provide for mitigation of the erosion that may otherwise occur. For example, a circular wear surface, such as illustrated in FIG. 1, may result in turbulence downstream of the wear surface where flow expands. The induced turbulence may impact the flow of particles around a bend, for example, or may impact the formation of a concentrated swirl. As flow velocities vary, the length of the turbulent zone formed downstream of the wear surface and the impact on the flow pattern may also vary. Adjusting an axial position of the wear surface in response to flow conditions may thus move the turbulence to a position that better mitigates the erosive effects of the flow.

Combinations of the above movement types may also be beneficial. In some embodiments, movable inserts may include one or more flow directing or flow disrupting surfaces disposed along the flow path and configured to move in two or more of circumferentially about the flow path, radially inwards and outwards, and axially along the flow path. In some embodiments, for example, an insert may be extendible radially and axially, and may be positioned at an angle relative to the bulk axial flow.

As with the index plates, sensors may be used to indicate a position of inserts that are movable axially, radially, and/or circumferentially. Likewise, mechanisms, such as one or more of a gear, a slide, a sleeve, a spring, a magnet or linear motor, and an actuator, may be used to control a position of the inserts.

Apparatus according to embodiments herein may include one movable insert, such as shown in FIG. 1, or may include multiple movable inserts. For example, multiple radially movable inserts, such as rods, may be disposed angularly around the flow path, where the apparatus may include mechanisms to control a position of each of the multiple movable inserts. For example, an apparatus may include eight radially movable rectangular prisms disposed 45 degrees apart around a flow path. The position of the radially movable inserts may be varied, independent or dependent of one another, to alter the downstream flow in a desired manner.

Examples of movable or static (passive) inserts that may take advantage of radial, axial, and/or circumferential movement are illustrated in FIGS. 5-17.

Figure 5:
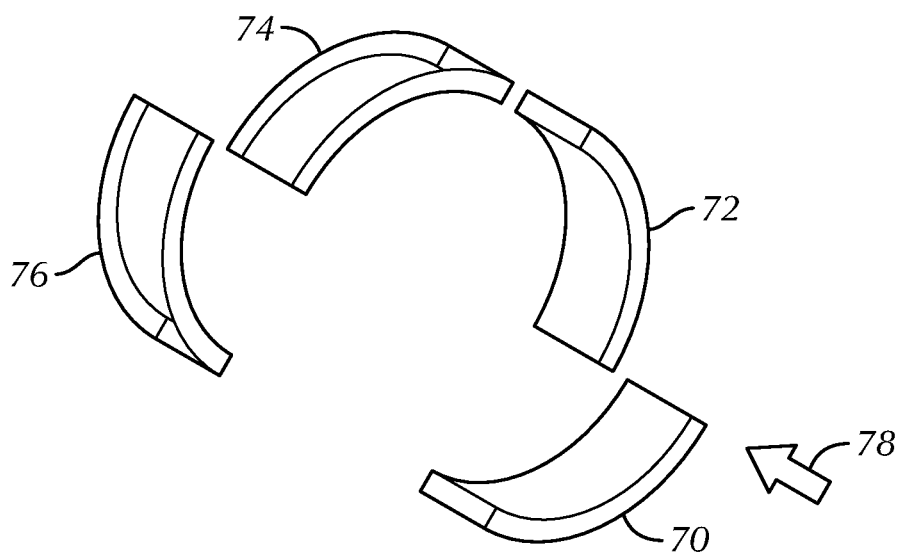
FIGS. 5-17 illustrate various movable or static (passive) inserts that may be used with apparatus according to embodiments disclosed herein.

FIG. 5 illustrates an insert including staggered sectors. As illustrated, the insert includes four portions, 70, 72, 74, and 76, each encompassing approximately a 90 degree sector of the flow path. Other embodiments may include any number of sectors, and may encompass greater or less than the full circumference of the flow path. Fluid flowing in direction 78 may first encounter sector insert 70, then sector insert 72, sector insert 74, and finally sector insert 78. The overall fluid flow may be disrupted by the sector inserts, which may induce localized eddies and/or a swirl within the bulk fluid flow that may disrupt the flow and mitigate erosion that would otherwise occur in the flowpipe (not illustrated). The overall position of the inserts may be movable circumferentially, for example, thus adjusting a position of the resulting swirl. Alternatively or additionally, the position of the inserts may be movable axially, advantageously moving the resulting eddies and swirl to a more desirable location to reduce erosion, such as based on the fluid flow rate or other properties of the fluid, as discussed above.

Figure 6:
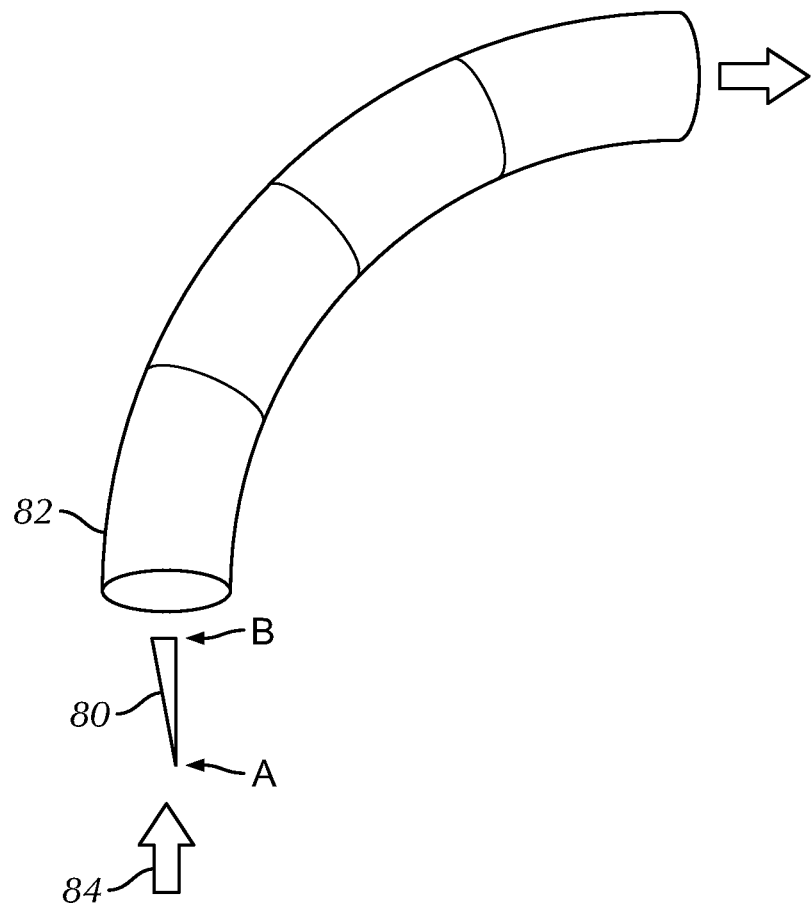

FIG. 6 illustrates an insert including a wedge. As illustrated, the wedge 80 may be disposed in an apparatus according to embodiments herein (not illustrated) disposed upstream of a bend in a flowpipe 82, for example. Fluid flowing in direction 84 may be partially diverted by wedge 80, inducing swirls and/or eddies that may disrupt the flow and mitigate erosion that would otherwise occur in flowpipe 82 along the bend or beyond. The wedge may have, for example, an angle A of 5 to 45 degrees, and the wedge may extend circumferentially at end B, for example, from 5 to 90 degrees of the flowpipe, for example. The angle of the wedge at the leading end may vary from 0 to 360 degree circumferentially, while the same applies to the trailing end. The overall position of the wedge inserts may be movable circumferentially, for example, thus adjusting a position of the resulting split flow paths. Alternatively or additionally, the position of the inserts may be movable axially and/or radially, advantageously moving the resulting eddies and swirl to a more desirable location to reduce erosion, or to replenish the wear surface or so as to have a greater or lesser impact on the bulk flow, as discussed above.

Figure 7:
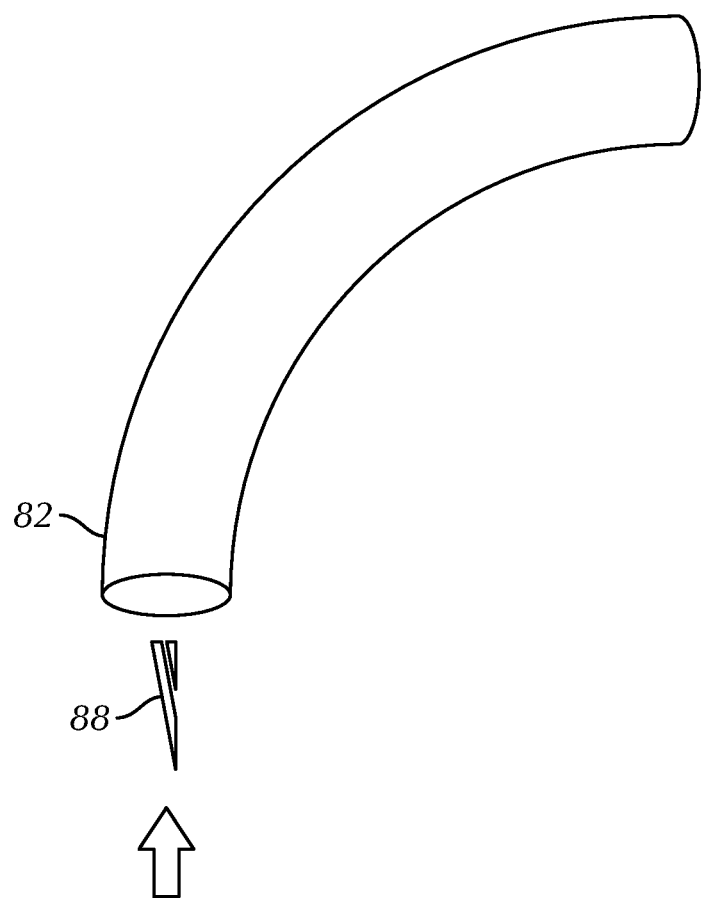

FIG. 7 illustrates an insert including a tandem wedge 88. Similar to the wedge described with respect to FIG. 6, the tandem wedge may include two or more subparts to divide the flow into three or more flow paths, for example. Other aspects, such as overall angles and circumferential extent, as well as movability, are similar to the wedge as described with respect to FIG. 6.

Figure 8A:
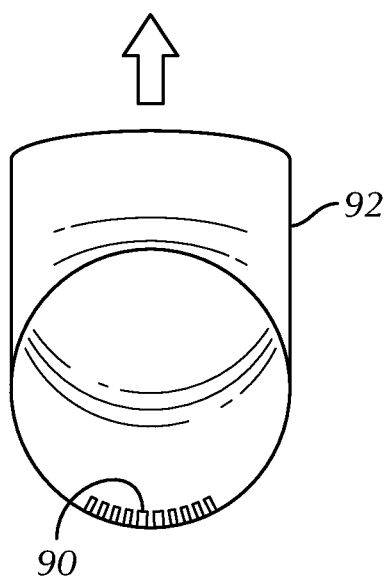
Figure 8B:
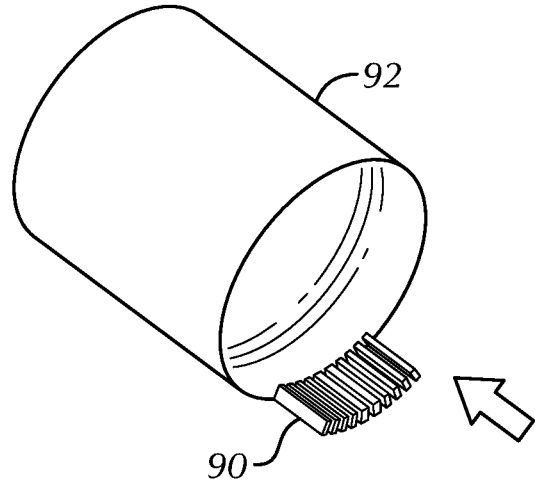

FIGS. 8A and 8B illustrate a localized sector insert with grooves. Insert(s) 90 may be formed as a unitary insert, or may include multiple individual inserts disposed within an apparatus according to embodiments herein to form the sector. The sector can individually or all together span up to 360 degree to form a full annular ring. The inserts may be movable axially and/or radially, for example, to adjust a position of the impact on flow by the insert, such as on pipe 92, illustrated as bending upward in FIG. 8A. A unitary or multiple individual inserts may be included to induce swirl to mitigate erosion.

Figure 9B:
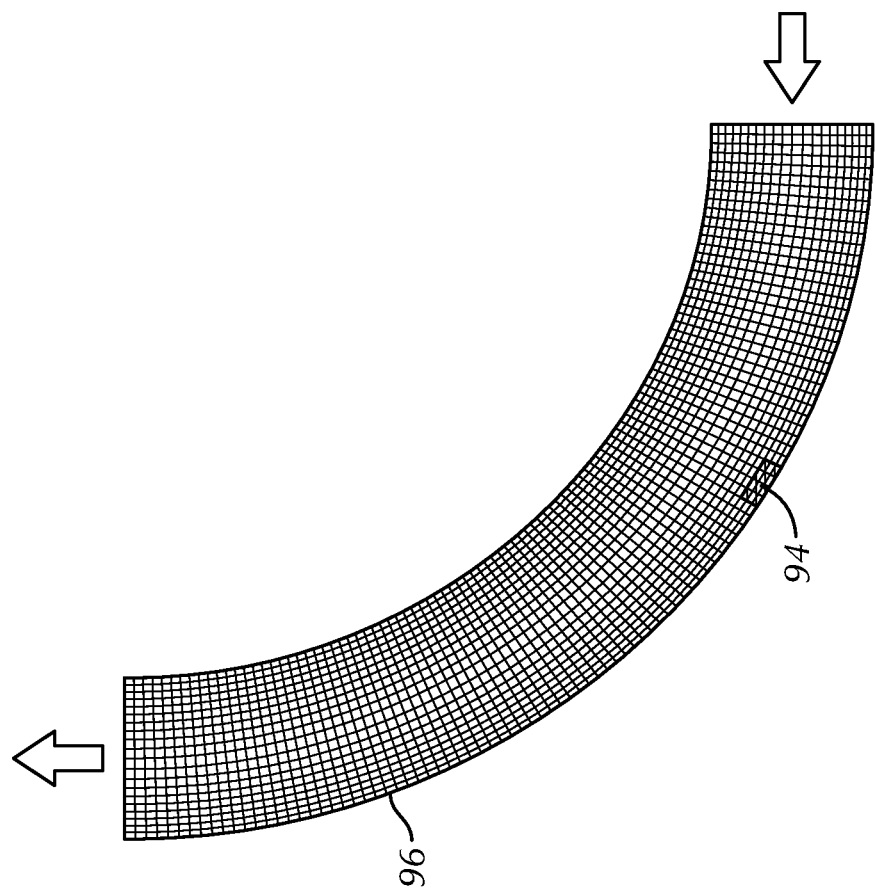
Figure 9A:
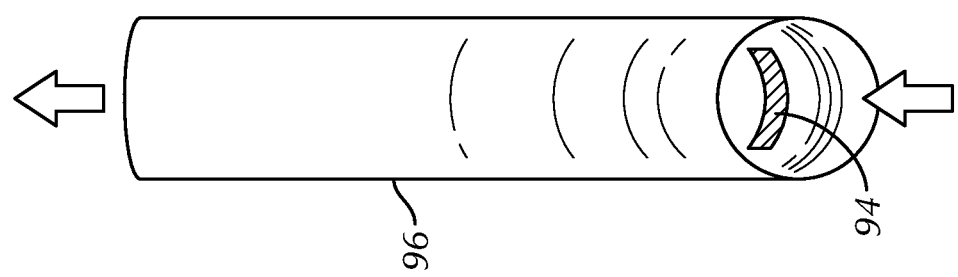
Figure 11:
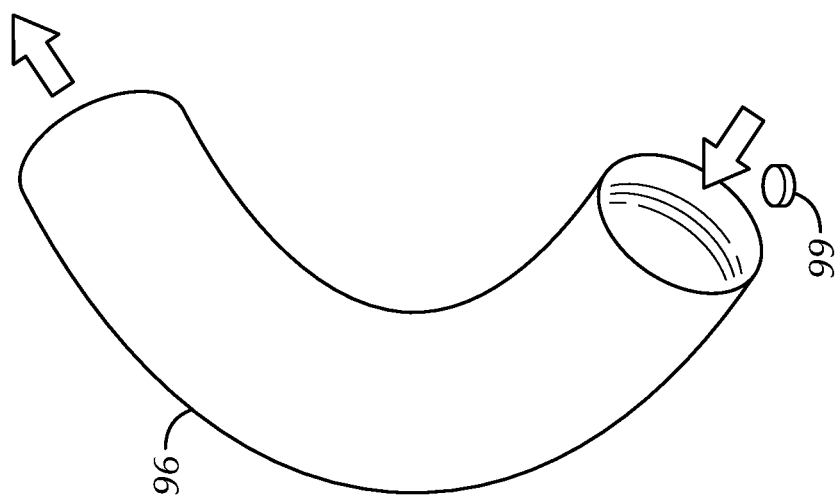
Figure 10:
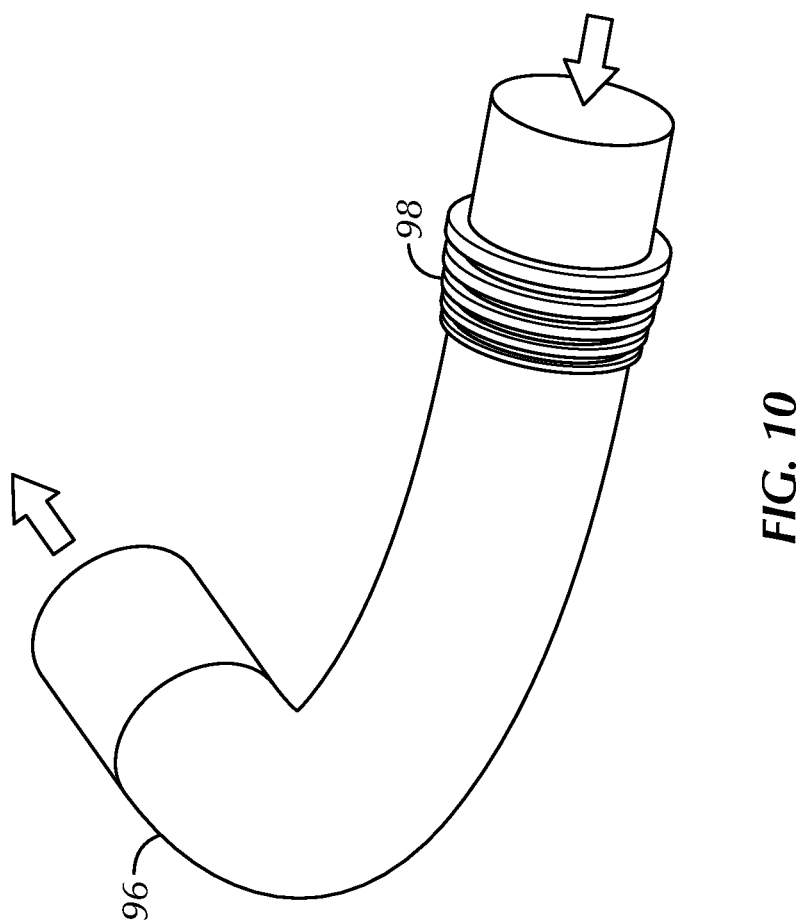

Apparatus according to embodiments herein, while described largely above as being disposed upstream of a bend, may also be disposed within a bend of a pipe, any type of a junction or in a straight pipe section. FIGS. 9A and 9B illustrate a sector insert or localized projection insert 94 disposed within a bend of a pipe 96. FIG. 10 illustrates an insert 98 that includes multiple grooves. In other embodiments single or multiple grooves can be axial, circumferential or a combination. FIG. 11 illustrates a circular insert 99. As with the other inserts described herein, inserts 94, 96, 98 may be movable axially, radially, or circumferentially within the apparatus so as to affect flow along and beyond a bend or other portions of a flow pipe in a desirable manner.

Figure 12A:
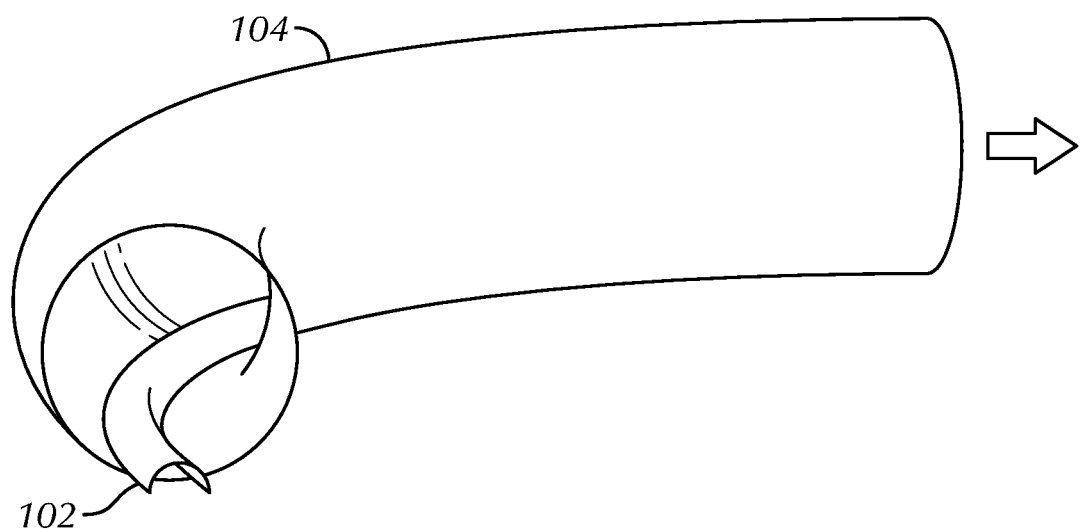
Figure 12B:
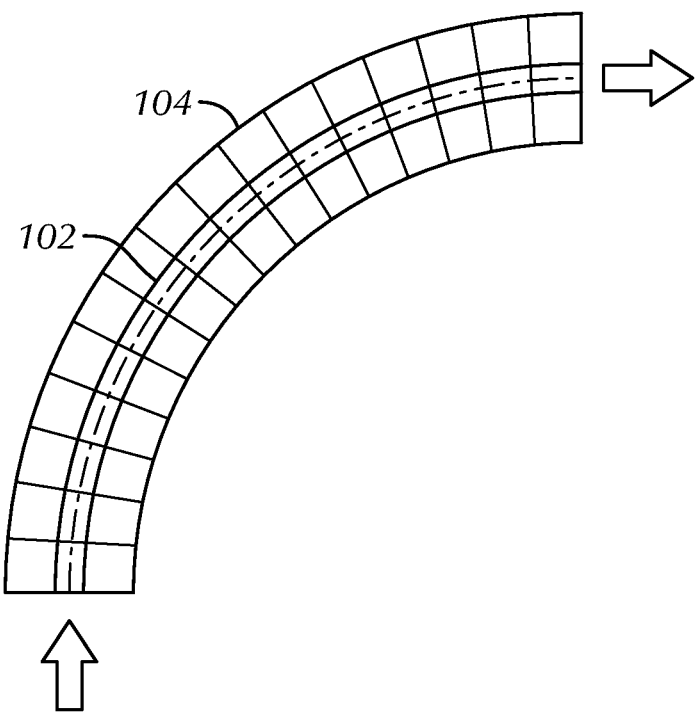
Figure 13A:
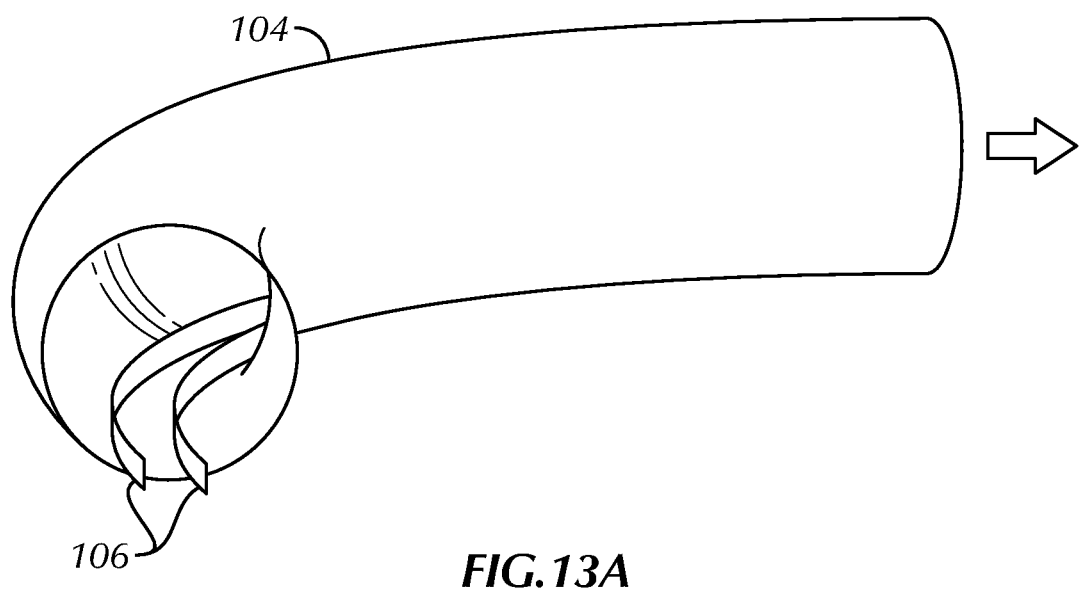
Figure 13B:
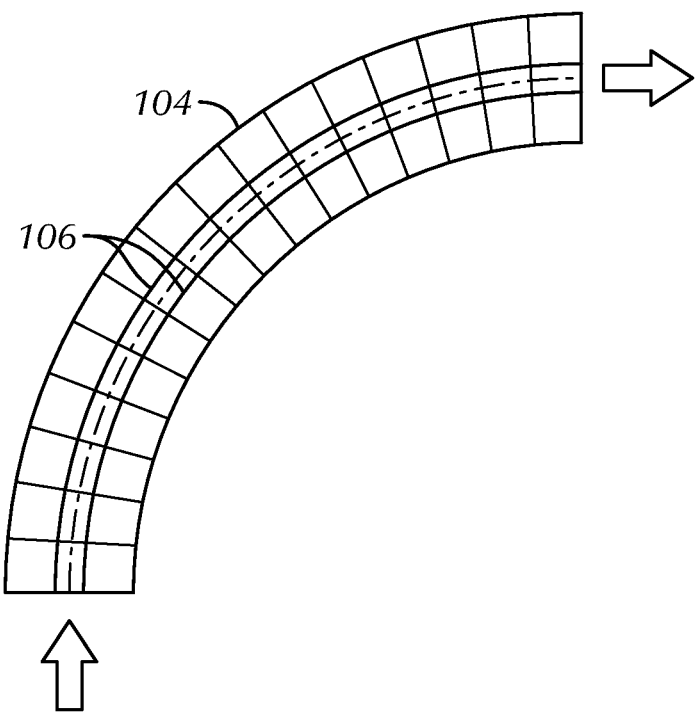

FIGS. 12A and 12B illustrate a pipe-in-pipe insert 102, which may include a semicircular or other portion of a pipe, for example. Flow through pipe 104 may thus pass intermediate insert 102 and pipe 104 between the concave portion of the insert and the pipe, as well as between the convex portion of the insert and the pipe. The flow in the convex portion of the insert and the pipe contains higher percentage of solids and predominantly heavier solids segregated from the flow. In some embodiments, the pipe-in-pipe insert 102 may be disposed within an apparatus according to embodiments herein located along a bend. In other embodiments, the pipe-in-pipe insert may extend from an apparatus according to embodiments herein into a bend in the flow pipe 104. In some embodiments single or multiple of these inserts can be disposed in a straight pipe or any type of junction. In some embodiments, the insert can be located at any position circumferentially and take helical shape along the bend. Similarly, FIGS. 13A and 13B illustrate a channel insert 106 that may be used to mitigate erosion. Where channel inserts 106 extend from an apparatus according to embodiments herein, a spacer bar (not illustrated) or other means may be used to maintain a desired spacing of the channel, such as where the material making the channel insert 106 is not sufficiently rigid to hold its shape.

Figure 14:
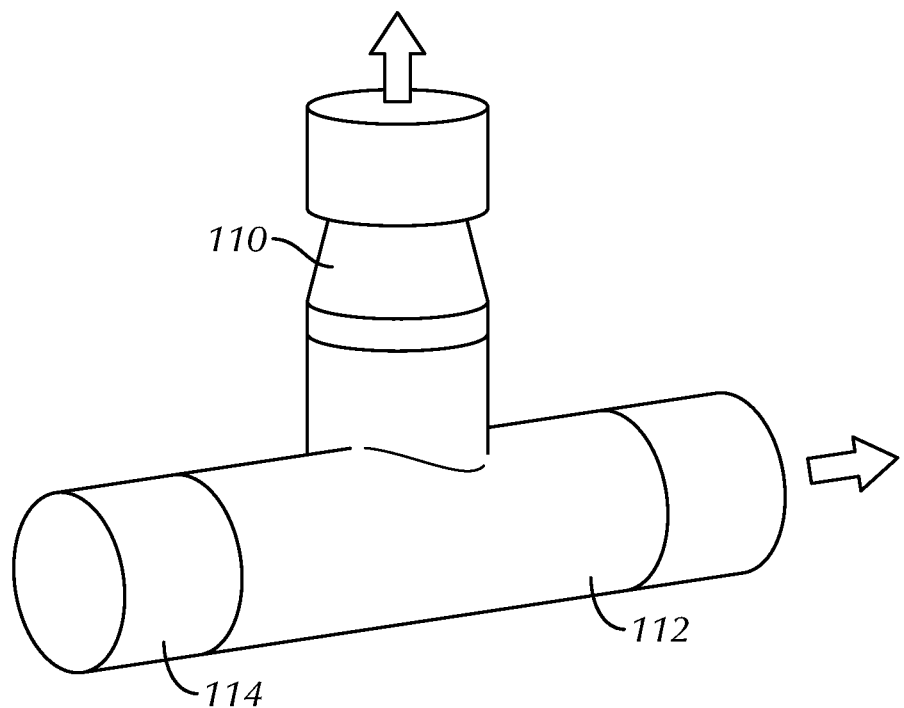

FIG. 14 illustrates a conical insert 110 disposed in the outlet of a blind tee in a flow path 112, where flow path 112 includes an extension 114 which is a part of the blind tee. The conical insert 110 may be movable axially within pipe 112, for example, thus adjusting a position of the eddies formed. Conical insert 110 may also be rotatable circumferentially, thus allowing replenishment of the wear surface, such as where the flow may preferentially impact the wear insert at a particular location (15° and/or 195° from an origin, for example, where rotation allows unworn wear surface, such as at 5° and 185°, to be rotated disposed at 15° and 195°, respectively).

Figure 15:
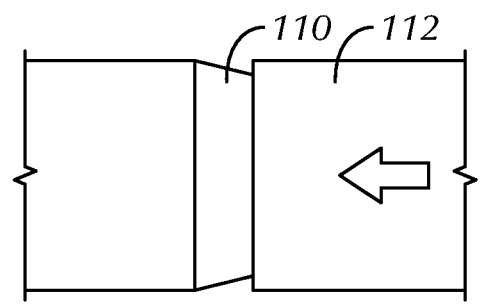
Figure 16:
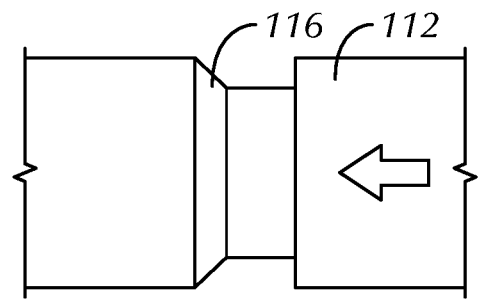

As illustrated in FIG. 14, the conical insert 110 is disposed downstream of a change in flow direction, with the cone narrowing along the flow direction. FIG. 15 illustrates a conical insert 110 disposed within a straight section of pipe, which may alternatively be upstream of a junction or downstream of a junction in various embodiments. Conical insert 110 is illustrated in the embodiment of FIG. 15 as having the cone narrowing contrary to the flow direction. FIG. 16 illustrates an insert 116 that may include both straight and diverging (or converging in some embodiments) portions. Each of the inserts illustrated in FIGS. 15 and 16, similar to that of FIG. 14, may be movable axially and/or circumferentially, for example.

Figure 17:
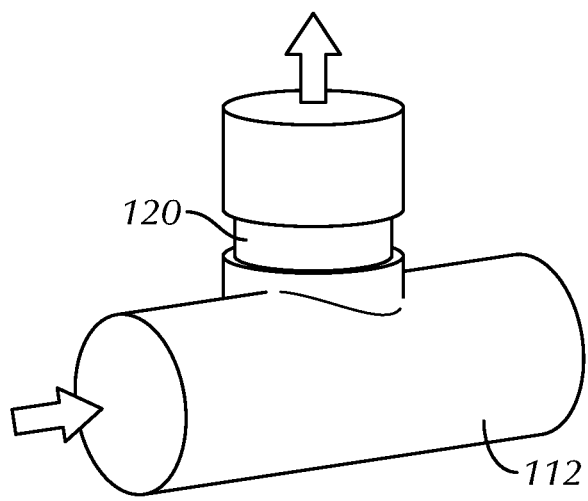

FIG. 17 illustrates a square/rectangular cross section insert 120 disposed downstream of a flow direction change in a blind tee 122. The insert can be disposed upstream of, downstream of, or inside a junction. The insert may be movable axially and/or circumferentially, for example. In other embodiments the insert can have any other polygonal cross section.

Systems for mitigating erosion in a flowline according to embodiments herein may include one or more flow directing or flow disrupting apparatus, as described above, disposed along a flowline. In some embodiments, two or more flow directing or flow disrupting apparatus may be used, including combinations where the multiple apparatus include those that passively impact the pattern of flow, actively impact the pattern of flow, or a combination of both passive and active apparatus.

Flow inserts according to embodiments herein may be formed from any number of hard or rigid materials. In some embodiments, for example, flow inserts may be formed using wear resistant materials, including various steel alloys or other erosion resistant materials or coatings. In other embodiments, the flow inserts may be formed from a softer metal base plate onto which a wear insert made from a wear resistant material or coating is disposed. In other embodiments, the flow inserts may be formed from a material with properties varying across a cross section.

In other embodiments, flow inserts may include surfaces formed partially or fully of a flexible material. Similar to a rigid flow insert that is rapidly moved back and forth, or fluttered as described above; a flow insert formed at least partially of a flexible material may flutter under certain flow conditions, which may create flow characteristics beneficial to suppress sand erosion. In other embodiments, the flow inserts can be fully or partly formed out of composite materials.

In yet other embodiments, flow inserts may be formed, fully or partially, of a softer material, such as a low alloy steel, lead, gold, silver, and aluminum. Resilient polymeric materials may also be used. Use of softer materials may absorb momentum of particles as they impact, which may reduce sand velocities and result in reduced erosion.

Flow inserts may be formed by any number of processes, including molding, casting, extrusion, drawing, cutting, and stamping, among others. For example, an index plate may be formed from a cast plate through which holes are cut or drilled. Similarly, replaceable wear inserts may be formed by any number of such processes. Coatings may also be disposed on wear surfaces of flow inserts or replaceable wear inserts by any number of hard facing processes commonly used to emplace a corrosion resistant alloy. Where replaceable inserts are used, they may be attached to a movable flow insert in any manner, including welding, press fit, riveting, or screws, among many other manners. Flow inserts can be made from processes to make materials with varying properties across a cross-section.

As alluded to above, systems for mitigating erosion in a flowline according to embodiments herein may include one or more flow directing or flow disrupting apparatus, as described above, disposed along a flowline, as well as a control system configured to adjust a position of the movable insert. In some embodiments, the control system may be configured to adjust a position of the movable insert based upon elapsed time, such as an estimated time over which a wear surface may become worn.

In other embodiments, the control system may be configured to adjust a position of the movable insert based upon a measured property of a fluid passing through the flowline. A measurement device or measurement devices may be provided to measure one or more properties of the flowing fluid. For example, measurement devices may be used to measure, estimate, or determine one or more of a bulk flow rate, a local flow velocity, a density, a solids content, a particle size of solids contained in the fluid, a composition of solids contained in the fluid, a momentum of particles contained in the fluid, a change in pressure across the apparatus.

The control system may be configured to adjust a position of the movable insert based upon a measured property of the fluid. As discussed at length above, the measured property may include a change in pressure, indicating wear of a flow disrupting surface, or may be used for active control measures to effect a desired flow change over varying flow conditions.

Mitigating erosion in a flowline according to embodiments herein may include disposing one or more flow directing or flow disrupting apparatus, as described above, along a flowline. For example, the apparatus may be positioned proximate expansions, bends, or other portions of a flow line, and may be placed upstream, downstream, or mid-stream of the portion of the flow line for which the apparatus is to impart a change in flow.

After the apparatus are disposed at desired locations along the flowline, fluid flow may be passed through the flowline and the apparatus. The position of the movable insert may then be adjusted so as to impact the flow behavior of the fluid within the flowline.

Mitigating erosion in a flowline according to embodiments herein may also include measuring a property of the fluid passing through the apparatus. The position of the movable insert may be adjusted based upon the measured property.

The placement and type of movable insert may depend upon the expected flow characteristics (composition, rates/velocities, particle sizes, variability, etc.), and may also depend on the configuration of the flowline (number of bends, diameter, length of straight sections, radius of curvature, angle of the change in flow direction, etc.). Methods for mitigating erosion according to embodiments herein may also include steps to determine the placement and type of the movable insert.

For example, processes for mitigating erosion may include a first step of analyzing a flow pattern of a section of flowline. Based on the flow pattern and expected fluid properties, a second step may include estimating one or more of a wear pattern or a wear rate along the section. The process may then include a step of determining one or more of a location of an insert, a size of the insert, a shape of the insert, a material of the insert, and a configuration of inserts to reduce the wear rate or alter the wear pattern. The analysis may be performed iteratively to determine the placement and type of the movable insert to optimally or near-optimally mitigate or reduce the erosive effects of the expected flow.

As noted above, flow conditions may vary, including changes in particle size, composition, states, velocities, etc. Processes for mitigating erosion may also include repeating the analyzing, estimating, and/or determining to create a result matrix encompassing two or more flow variables, such as a bulk flow rate, a local flow velocity, a density, a solids content, a particle size of solids contained in the fluid, a composition of solids contained in the fluid, a momentum of particles contained in the fluid, a change in pressure across the apparatus, a location of the insert, a position of the insert, a size of the insert, a shape of the insert, and a configuration of inserts. The analyzing, estimating, and/or determining to create a matrix may also include lab and/or field testing at various flow conditions, deriving inputs for models, for example, as well as numerical analyses, which may use the data as an input to a model or as a model verification tool. Based on the matrix results, and the measured properties of flow, an adjustment to a position of the movable insert may be effected to reduce the wear rate or alter the wear pattern.

Figure 4A:
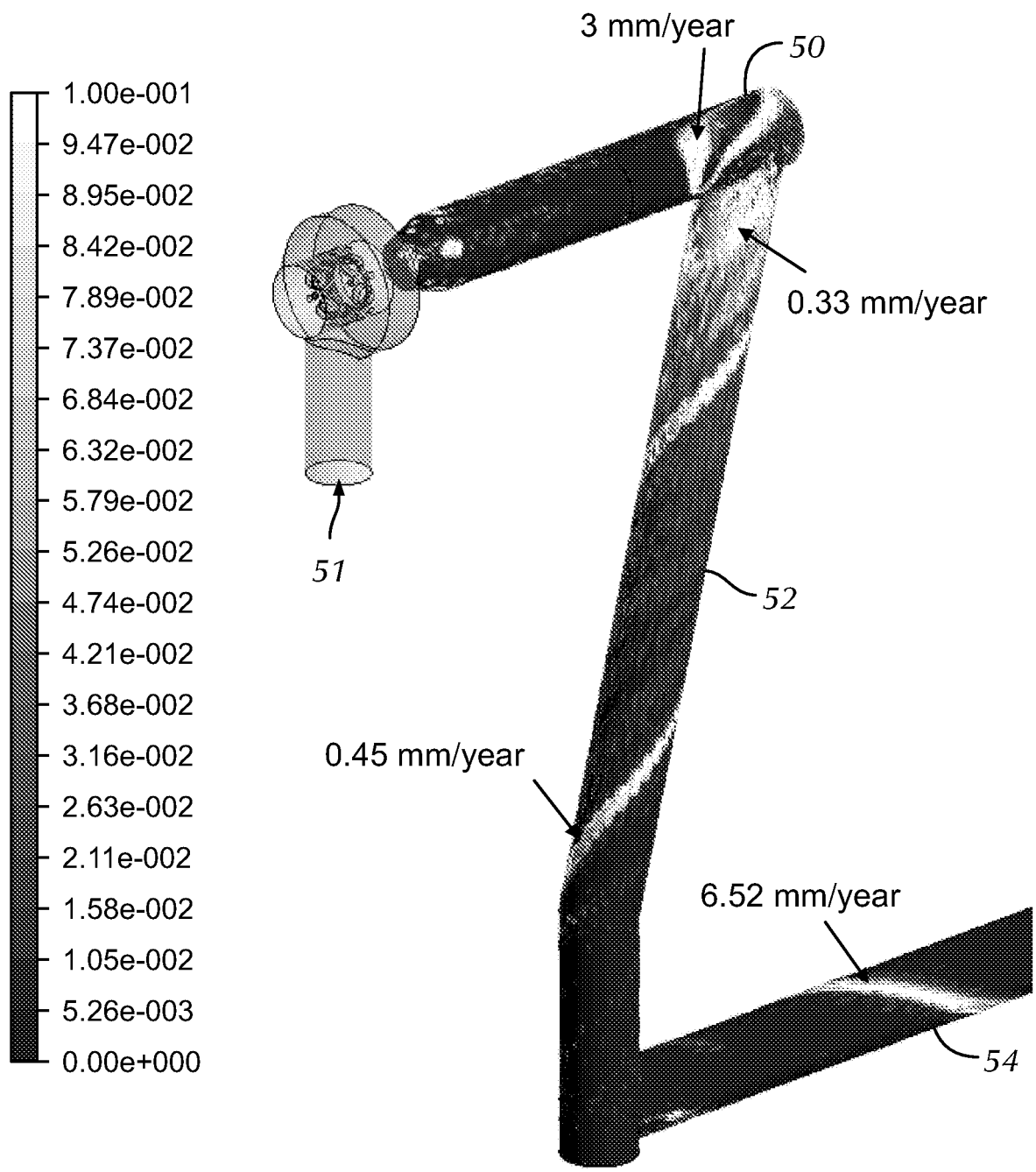
FIGS. 4A and 4B compare simulation results of flowlines without and with apparatus for mitigating erosion according to embodiments herein, respectively.
Figure 4B:
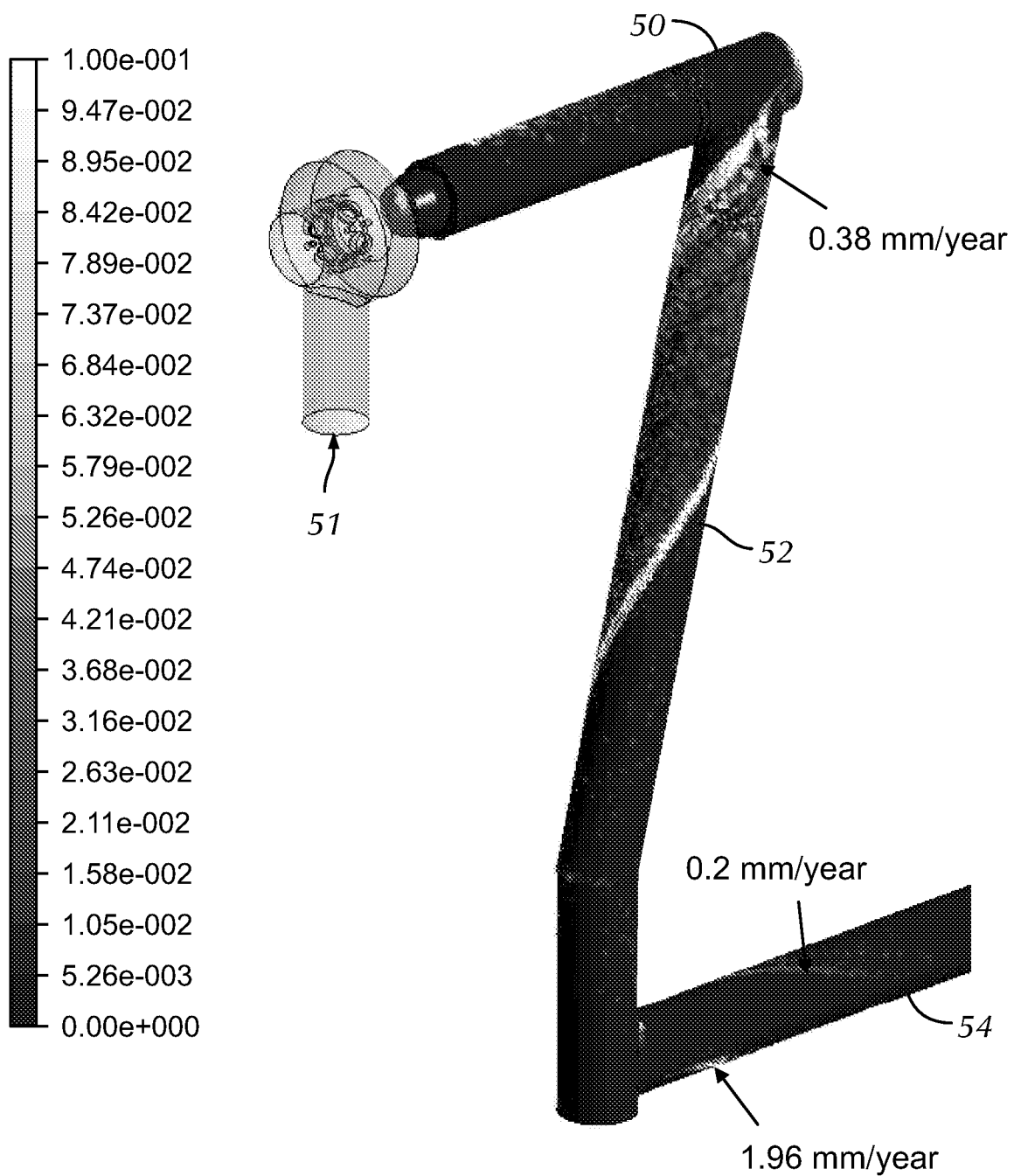

An example of the benefits of flow inserts according to embodiments herein is illustrated in FIGS. 4A and 4B. FIG. 4A is a baseline design for a flowline including a "Z" bend. Produced fluid enters the flowline upward proximate at the upper portion of the "Z", as indicated by flow arrow 51. FIG. 4A presents simulation results for a "baseline" design, without flow modification devices. As can be seen, the flow configuration results in an area 50 of localized recirculation, as well as a strong swirl along middle portion 52 and lower portion 54. The erosive effects of an unaltered flow pattern are estimated to be 3 mm/y proximate area 50, and the strong swirl may result in erosion rates of over 6 mm/y in area 54.

FIG. 4B presents flow simulation results for a similar flowline configuration including a movable insert according to embodiments herein. The insert used was an annular insert having a square cross-section, similar to that illustrated in FIG. 17, but positioned proximate the end of the expansion joint (slightly upstream of area 50). As a result, the recirculation area near area 50 is eliminated, significantly reducing erosion, and the strong swirl in areas 52 and 54 is stretched, reducing the strength of the swirl and reducing erosion rates significantly in each of areas 52 and 54.

As described above, apparatus for mitigating erosive effects of flow according to embodiments herein include movable inserts. Movable inserts may provide greater benefit as compared to static inserts, which may wear and become ineffective, or which may be ineffective under varying flow conditions. Movable inserts according to embodiments herein may provide for extended service life of flow lines, reducing localized recirculation, stretching and reducing the strength of swirls, directing particles away from walls, and effectively tuning and smoothing out the flow, overall reducing the abrasive effects of particles passing through a flowline. Movable inserts according to embodiments herein may advantageously provide for renewal of flow disrupting or flow directing surfaces. Movable inserts according to embodiments herein may also advantageously provide for real-time erosion control based on fluid flow characteristics to impart a favorable effect on the flow.

Although described above as being useful as movable inserts, inserts described herein, such as one or more of those described and illustrated in FIGS. 5-17, may be useful as non-movable inserts within a pipe system. While the advantage of replenishable wear surfaces and the ability to move the swirl or other flow dynamics in a desired manner, such inserts may provide advantages over present inserts commonly used in the industry.

As described above, inserts useful with apparatus according to embodiments herein, or alternatively as non-movable inserts disposed in flow lines, may include one or more of a circumferential circular insert; a wedge insert; a tandem wedge insert; a conical insert; an insert comprising straight and either or both converging or diverging portions; a pipe-in-pipe insert; a channel insert; a square/triangular/rectangular/any polygonal cross-section insert; a circular projection insert; a sector insert; a sector insert with grooves; or a staggered sector insert; an insert with circumferential grooves (annular, axial, helical or combination).

Apparatus for reducing wear as described herein may thus include inserts that may be used in one or more modes, including a static (passive) mode, a quasi-static mode, or a continuous mode. For example, a movable insert as illustrated in FIG. 1 may be positioned within a flow line, and held static until a particular wear surface is worn sufficiently. A quasi-static mode may be used, for example, where calculations regarding flow conditions and preferred placement of the insert are made only periodically, adjusting a position of the insert intermittently, or such as where a wear surface of a positional insert (circular insert of FIG. 11, for example) is renewed periodically by extending additional length of the insert into the flow area. A continuous mode may be used, for example, where a position of an insert is adjusted at a high frequency based on flow conditions, for example. Methods according to embodiments herein may thus provide for configuring the apparatus to permanently or intermittently operate in one or more of a static (passive) mode, a quasi-static mode, or a continuous mode.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:
1. An apparatus for mitigating erosion in flow conduits, comprising:
 a housing configured to be disposed in a flow conduit including a fluid inlet and a fluid outlet and a flow path there between;
 a movable insert disposed within the housing and configured to disrupt or direct a flow pattern of a fluid passing from the fluid inlet to the fluid outlet to thereby alter a wear pattern along the flow conduit, wherein the movable insert comprises an index plate having two or more holes positionable within the flow path, and wherein the movable insert comprises replaceable wear surfaces disposed in one or more of the at least two holes; and
 a mechanism to adjust a position of the movable insert.

2. The apparatus of claim 1, wherein the two or more holes are configured to restrict flow proximate an entire perimeter or circumference of an inner surface of the flow path.

3. The apparatus of claim 1, wherein the two or more holes are configured to restrict flow proximate a portion of a perimeter or circumference of an inner surface of the flow path.

4. The apparatus of claim 1, wherein:
the two or more holes are spaced apart angularly on the index plate; and
the mechanism is configured to rotate the index plate.

5. The apparatus of claim 4, wherein the two or more holes are spaced equally.

6. The apparatus of claim 1, wherein:
the two or more holes are spaced apart linearly on the index plate; and
the mechanism is configured to move the index plate linearly.

7. The apparatus of claim 6, wherein the two or more holes are spaced equally.

8. The apparatus of claim 1, further comprising a seal fluidly isolating a portion of the index plate from the fluid inlet and the fluid outlet.

9. The apparatus of claim 1, wherein a position of the replaceable wear inserts is adjustable.

10. The apparatus of claim 1, wherein the housing further comprises an access port configured to provide access to the fluidly isolated portion of the index plate such that a worn replaceable wear surface may be replaced while fluid is passing through the housing from the inlet to the outlet.

11. The apparatus of claim 1, configured to operate in a static mode, intermittently moving mode, continuously moving mode or a combination of two or more such modes.

12. The apparatus of claim 1, further comprising:
a first pressure tap upstream of the movable insert; and
a second pressure tap downstream of the movable insert.

13. The apparatus of claim 1, further comprising a sensor to indicate a position of the movable insert.

14. The apparatus of claim 1, wherein the mechanism comprises one or more of a gear, a slide, a sleeve, a spring, a magnet, and an actuator.

15. A system for mitigating erosion in a flow conduit, the system comprising:
an apparatus as defined in claim 1; and
a control system configured to adjust a position of the movable insert.

16. An apparatus for mitigating erosion in flow conduits, comprising:
a housing configured to be disposed in a flow conduit including a fluid inlet and a fluid outlet and a flow path there between;
a movable insert disposed within the housing and configured to disrupt or direct a flow pattern of a fluid passing from the fluid inlet to the fluid outlet to thereby alter a wear pattern along the flow conduit; and
a mechanism to adjust a position of the movable insert;
wherein the movable insert comprises one or more wear surfaces disposed along the flow path and configured to move in one or more of radially inwards and outwards, axially along the flow path, or circumferentially about the flow path.

17. The apparatus of claim 16, wherein the movable insert comprises:
one or more wear surfaces disposed along the flow path and configured to move in two or more of circumferentially about the flow path, radially inwards and outwards, and axially along the flow path.

18. The apparatus of claim 16, further comprising:
a first pressure tap upstream of the movable insert; and
a second pressure tap downstream of the movable insert.

19. The apparatus of claim 16, further comprising a sensor to indicate a position of the movable insert.

20. The apparatus of claim 16, wherein the mechanism comprises one or more of a gear, a slide, a sleeve, a spring, a magnet, and an actuator.

21. The apparatus of claim 16, wherein the movable insert comprises one or more of:
a circumferential circular insert;
a wedge insert;
a tandem wedge insert;
a conical insert;
an insert comprising straight and either or both converging or diverging portions;
a pipe-in-pipe insert;
a channel insert;
a square/triangular/rectangular/polygonal cross-section insert;
a circular projection insert;
a sector insert;
a sector insert with grooves; or
a staggered sector insert;
an insert with circumferential grooves.

22. The apparatus of claim 16, configured to operate in a static mode, intermittently moving mode, continuously moving mode or a combination of two or more such modes.

23. A system for mitigating erosion in a flow conduit, the system comprising:
an apparatus as defined in claim 16; and
a control system configured to adjust a position of the movable insert.

24. The system of claim 23, wherein the control system is configured to adjust a position of the movable insert based upon elapsed time.

25. The system of claim 23, further comprising a measurement device to measure a property of a fluid passing through the flow conduit.

26. The system of claim 25, wherein the property of the fluid is one or more of a bulk flow rate, a local flow velocity, a density, a solids content, a particle size of solids contained in the fluid, a composition of solids contained in the fluid, a momentum of particles contained in the fluid, a change in pressure across the apparatus.

27. The system of claim 25, wherein the control system is configured to adjust a position of the movable insert based upon a measured property of the fluid.

28. A method of mitigating erosion in a flow conduit, the method comprising:
disposing an apparatus in a flow conduit, the apparatus comprising:
a housing configured to be disposed in a flow conduit including a fluid inlet and a fluid outlet and a flow path there between;
a movable insert disposed within the housing and configured to disrupt or direct a flow pattern of a fluid passing from the fluid inlet to the fluid outlet to thereby alter a wear pattern along the flow conduit; and
a mechanism to adjust a position of the movable insert;
passing a fluid through the apparatus;
measuring a property of the fluid passing through the apparatus, wherein the property measured includes one or more of a bulk flow rate, a local flow velocity, a density, a solids content, a particle size of solids contained in the fluid, a composition of solids contained in the fluid, a momentum of particles contained in the fluid, and a change in pressure across the apparatus; and adjusting a position of the movable insert.

29. The method of claim 28, wherein the position of the movable insert is adjusted based upon the measured property.

30. The method of claim 28, further comprising:
analyzing a flow pattern of a section of the flow conduit;
estimating one or more of a wear pattern or a wear rate along the section;
determining one or more of a location of an insert, a size of the insert, a shape of the insert, a material of the insert, and a configuration of inserts to reduce the wear rate or alter the wear pattern.

31. The method of claim 30, further comprising repeating the analyzing and estimating to create a result matrix for two or more variables selected from a bulk flow rate, a local flow velocity, a density, a solids content, a particle size of solids contained in the fluid, a composition of solids contained in the fluid, a momentum of particles contained in the fluid, a change in pressure across the apparatus, a location of the insert, a size of the insert, a shape of the insert, and a configuration of inserts.

32. The method of claim 31, further comprising determining an adjustment to a position of the movable insert based upon the result matrix to reduce the wear rate or alter the wear pattern.

33. The method of claim 32, wherein the position of the movable insert is adjusted based on the result matrix and a measured property of the fluid.

34. The method of claim 28, wherein the apparatus comprises one or more replaceable wear surfaces, the method further comprising replacing a replaceable wear surface.

35. The method of claim 34, further comprising measuring an on-stream time for a wear surface.

36. The method of claim 28, further comprising configuring the apparatus to permanently or intermittently operate in one or more of a static mode, a quasi-static mode, or a continuous mode.

\* \* \* \* \*